United States Patent
Dellock et al.

(10) Patent No.: US 11,305,706 B2
(45) Date of Patent: Apr. 19, 2022

(54) VEHICLE APPLIQUES

(71) Applicant: Ford Global Technologies, LLC, Dearborn, MI (US)

(72) Inventors: Paul Kenneth Dellock, Northville, MI (US); Richard Gall, Ann Arbor, MI (US); David Brian Glickman, Southfield, MI (US); Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 16/426,344

(22) Filed: May 30, 2019

(65) Prior Publication Data

US 2020/0377040 A1    Dec. 3, 2020

(51) Int. Cl.
*B60R 13/04* (2006.01)
*G02B 5/32* (2006.01)
*G02B 5/18* (2006.01)

(52) U.S. Cl.
CPC ............ *B60R 13/04* (2013.01); *G02B 5/1852* (2013.01); *G02B 5/1857* (2013.01); *G02B 5/1861* (2013.01); *G02B 5/32* (2013.01)

(58) Field of Classification Search
CPC .......... B60R 13/04; G02B 5/1861; G02B 5/32
USPC ........................................................ 359/567
See application file for complete search history.

(56) References Cited

U.S. PATENT DOCUMENTS

| | | | |
|---|---|---|---|
| 4,877,657 A | 10/1989 | Yaver | |
| 6,489,266 B1 * | 12/2002 | Kurokawa | B41M 5/502 428/32.39 |
| 7,157,135 B2 * | 1/2007 | Decker | B32B 27/08 428/212 |
| 7,820,269 B2 * | 10/2010 | Staub | B42D 25/328 428/156 |
| 8,852,719 B2 * | 10/2014 | Fitch | B44C 1/1716 428/156 |
| 10,035,473 B2 | 7/2018 | Salter et al. | |
| 10,232,594 B2 * | 3/2019 | Mitchell | B29C 48/0018 |
| 2003/0107709 A1 * | 6/2003 | Rodick | B32B 27/302 353/1 |
| 2010/0253919 A1 | 10/2010 | Douglas | |
| 2017/0297508 A1 | 10/2017 | Dellock et al. | |
| 2018/0281506 A1 * | 10/2018 | Egashira | B32B 27/302 |

* cited by examiner

*Primary Examiner* — Collin X Beatty
(74) *Attorney, Agent, or Firm* — Vichit Chea; Price Heneveld LLP

(57) ABSTRACT

A vehicle applique includes a base structure and a polymeric coating disposed on the base structure. The polymeric coating at least partially covers an outer surface of the base structure. A diffraction grating is integrally defined by the polymeric coating. The diffraction grating has a thickness in a range of from about 100 nm to about 300 nm.

12 Claims, 8 Drawing Sheets though the figures are not necessarily to scale, and certain features and certain views of the figures may be shown exaggerated in scale or in schematic in the interest of clarity and conciseness. -->

VEHICLE APPLIQUES

FIELD OF THE DISCLOSURE

The present disclosure generally relates to vehicle appliques. More specifically, the present disclosure relates to vehicle appliques with diffraction grating and methods of making the same.

BACKGROUND OF THE DISCLOSURE

Iridescent components may offer a unique and attractive viewing experience. The iridescent components may upgrade the aesthetics of a vehicle. Typically, to upgrade the aesthetics of the vehicle, molded plastic components are formed to resemble jewels, which are then attached to the vehicle.

SUMMARY OF THE DISCLOSURE

According to at least one aspect of the present disclosure, a vehicle applique includes a base structure and a polymeric coating disposed on the base structure. The polymeric coating at least partially covers an outer surface of the base structure. A diffraction grating is integrally defined by the polymeric coating. The diffraction grating has a thickness in a range of from about 100 nm to about 300 nm.

According to another aspect of the present disclosure, a method of manufacturing a vehicle applique includes providing a mold and selectively etching a first pattern on at least one surface of the mold. A second pattern is selectively nano-engraved on the at least one surface of the mold. The second pattern includes a diffraction grating. A base structure is positioned within the mold. A polyurethane coating is injection molded into the mold.

According to another aspect of the present disclosure, a method of manufacturing a vehicle applique including providing a mold and nano-engraving a diffraction grating on a surface of the mold. The surface of the mold is heated via induction heating. A base structure is positioned within the mold. A polymeric coating is injection molded over the base structure.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
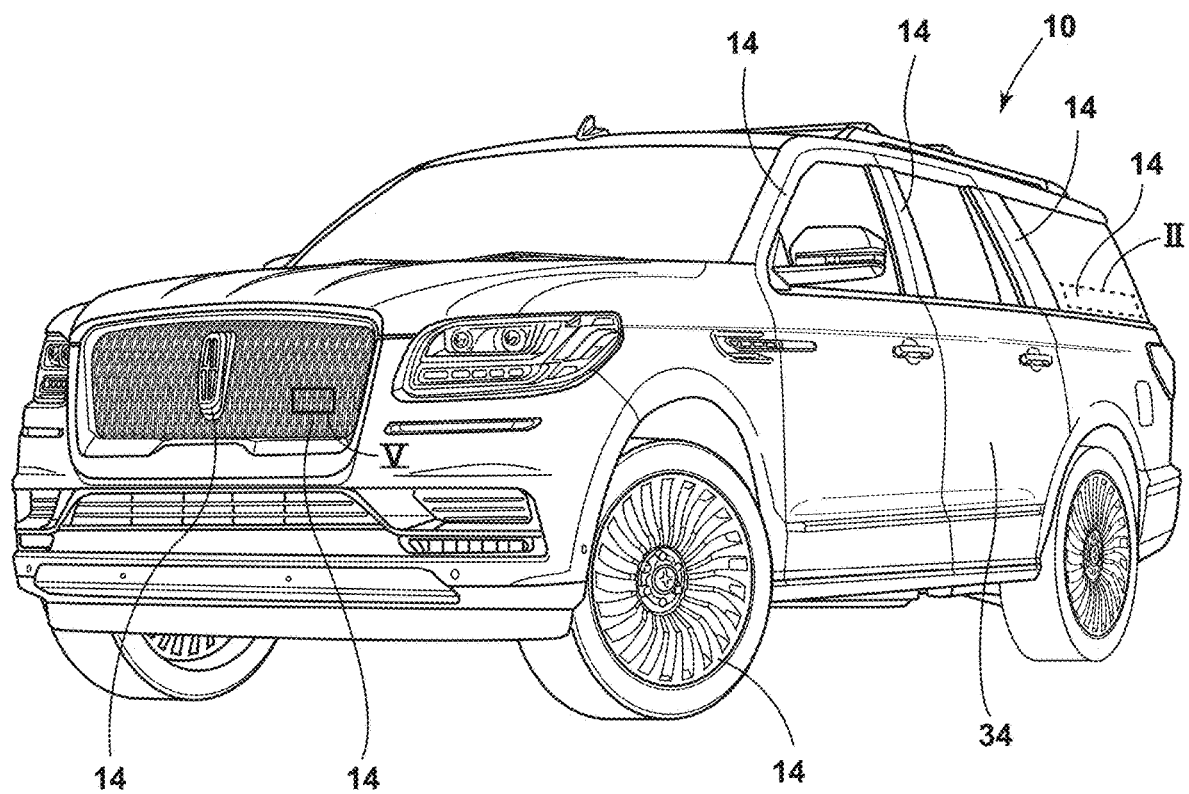
FIG. 1 is a front perspective view of a vehicle including appliques, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 10 generally refers to a vehicle having an applique 14. The applique 14 includes a base structure 18 and a polymeric coating 22 disposed on the base structure 18. The polymeric coating 22 at least partially covers an outer surface 26 of the base structure 18. A diffraction grating 30 is integrally defined by the polymeric coating 22. The diffraction grating 30 has a thickness in a range of from about 100 nm to about 300 nm.

Referring to FIG. 1, the vehicle 10 having various appliques 14 is illustrated in one example. The vehicle 10 is a wheeled motor vehicle depicted as a sport utility vehicle, but may also be a sedan, a truck, a van, a crossover, or other style of vehicle 10. The vehicle 10 may be a manually operated vehicle 10 (e.g., with a human driver), a fully autonomous vehicle 10 (e.g., no human driver), or a partially autonomous vehicle 10 (e.g., may be operated with or without a human driver). Additionally, the vehicle 10 may be utilized for personal and/or commercial purposes, such as for ride-providing services (e.g., chauffeuring) and/or ride-sharing services.

The vehicle 10 may include a variety of appliques 14 for providing a selected aesthetic for the vehicle 10. The appliques 14, as illustrated in FIG. 1, may be positioned on an exterior 34 of the vehicle 10 and may also be positioned on an interior of the vehicle 10. For example, the applique 14 may be a grille applique, an emblem, a wheel applique, a door panel, a pillar feature (e.g., A-, B-, and/or C-pillars), or other trim pieces or appliques 14. Additionally or alternatively, the applique 14 may be disposed on an interior of the vehicle 10. For example, the applique 14 may be a steering wheel cover, an infotainment system cover, a dash cover of an instrument panel, or an interior door cover. It will be understood that the foregoing description is exemplary and that other appliques (e.g., center console cover, glove box door, cup holder, interior pillar covers, instrument cluster hood) may be equally applicable to the teachings provided herein.

Figure 2:
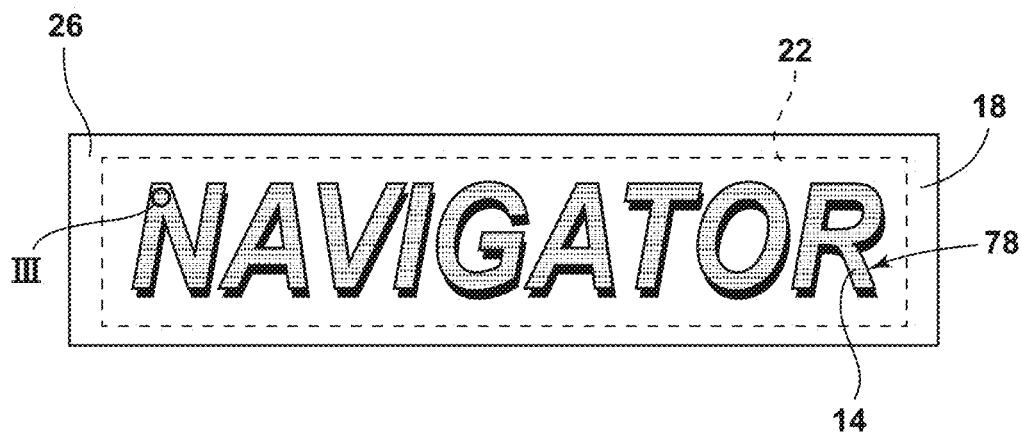
FIG. 2 is an enlarged view of a window applique of FIG. 1, taken at section II.

Referring to FIGS. 1 and 2, the applique 14 may be formed of the base structure 18 defining one or more surfaces, including an outer surface 26 that may not be directly coupled to the vehicle 10. The base structure 18 may include, acrylic, polycarbonate (PC), polypropylene, nylon, acrylonitrile styrene acrylate (ASA), polycarbonate acrylonitrile styrene acrtlate (PC ASA), acrylonitrile butadiene styrene, polylactic acid, polyethersulfone, polyethylene, polyvinyl chloride, a liquid crystal polymer, cyclo-olefin copolymer, other thermoplastic materials, thermoset materials and/or combinations thereof. The base structure 18 may be molded to the selected shape depending on the selected applique 14.

The applique 14 may have the polymeric coating 22 disposed on at least one of the surfaces of the base structure 18. In a specific example, the polymeric coating 22 may partially or entirely cover the outer surface 26 of the base structure 18. The polymeric coating 22 includes polyurethane, polyuria, or another optically clear polymeric material 22A. As used herein, the term "optically clear" refers to a material that has a high light transmittance over at least a portion of the visible light spectrum (about 400 nm to about 700 nm) and that exhibits low haze. Both the luminous transmission and the haze can be determined using, for example, the method 200 of ASTM-D 1003-95. In various examples, the polymeric coating 22 has about 10% haze or less, about 5% haze or less, and/or about 2% haze or less. The polymeric coating 22 may be advantageous for providing an optically clear, scratch-resistant coating to protect the base structure 18. Further, the polymeric coating 22 may be self-healing. As used herein, "self-healing" refers to a material that can automatically and/or intrinsically correct damage without human intervention. The self-healing aspect may be intrinsic and autonomous or may activate in response to an external stimulus (e.g., light 42, temperature, etc.). The ability to correct damage caused by normal usage may decrease costs and increase the life of the material.

Figure 3:
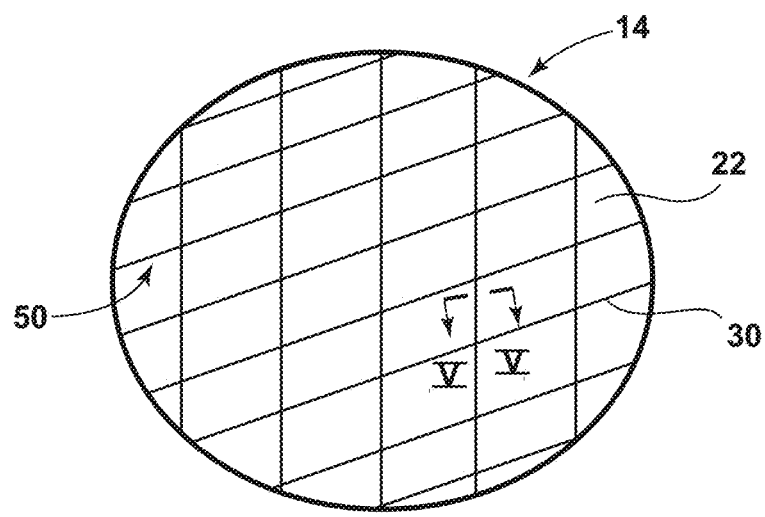
FIG. 3 is an enlarged view of the applique of FIG. 2, taken at section III.
Figure 4:
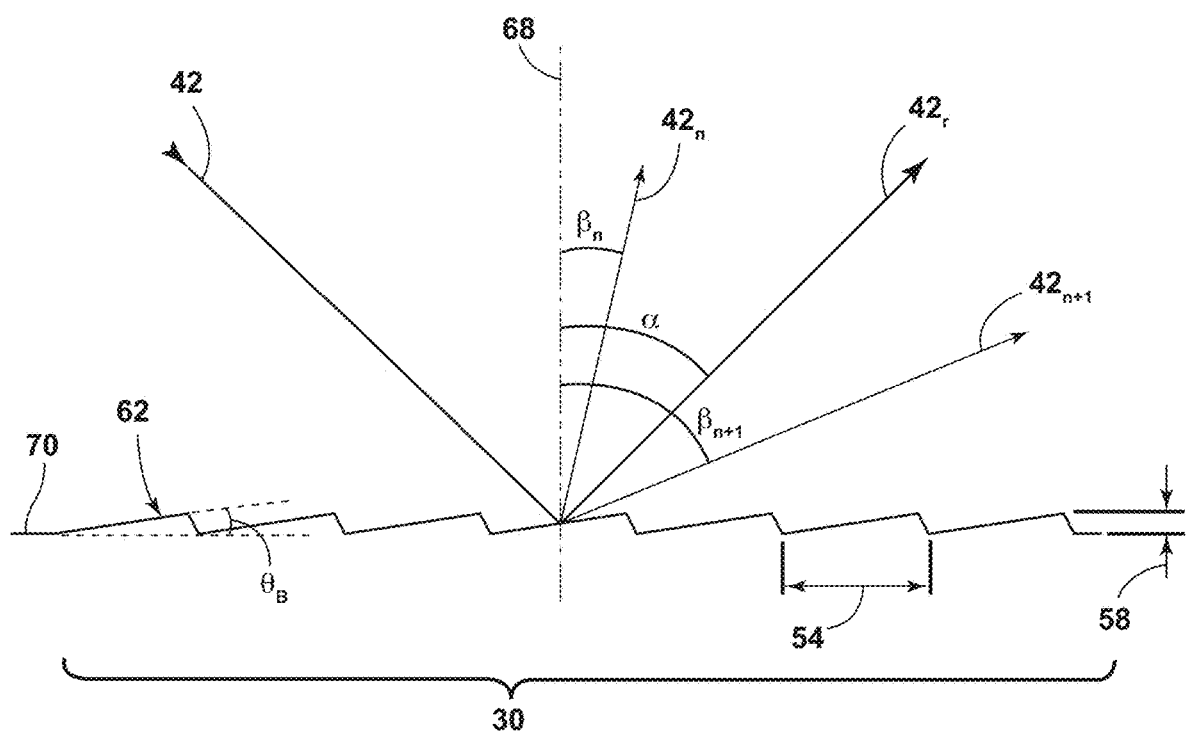
FIG. 4 is a cross-sectional view of a diffraction grating of FIG. 3 taken along line IV-IV.

Referring to FIGS. 3 and 4, the polymeric coating 22 may define the diffraction grating 30. The diffraction grating 30 extends across the entire polymeric coating 22, or across discrete portions of the polymeric coating 22. As illustrated in FIG. 3, the diffraction grating 30 may form a pattern 50 in the polymeric coating 22. However, it is also contemplated that the diffraction grating 30 may not form a pattern 50, and may instead be random. The diffraction grating 30 may define a variety of patterns 50. For example, the diffraction grating 30 may include a ruled grating pattern having ridges and grooves. Additionally or alternatively, the diffraction grating 30 may include a holographic grating pattern having a sinusoidal shape. Additionally or alternatively still, the diffraction grating 30 may include a spaced-holographic pattern having alternating plateaus and rounded grooves. The applique 14 may include a single diffraction grating 30, or more than one diffraction grating. In examples with more than one diffraction grating 30, the different diffraction gratings 30 may have different properties (e.g., spacing, period 54, or blaze angle $\theta_B$) which may cause each diffraction grating 30 to diffract light differently (i.e., be noticeably different from one another).

The diffraction grating 30 may be distinguished from traditional texturing or ridging of appliques 14 in that traditional texturing or ridging is configured to decrease shine, glare, reflectance and/or optical effects from the appliques 14, while the diffraction gratings 30 is configured to diffract and scatter light 42 impinging on the applique 14. The diffraction grating 30 is an optical component with a periodic structure, which splits and diffracts incident light 42 into several beams traveling in different directions. The directions of these beams depend on the spacing of the diffraction grating 30 and the wavelength of the light 42, so that the diffraction grating 30 acts as the dispersive element. With reference to FIG. 4, the diffraction grating 30 is configured to produce an iridescent pattern to light 42 impinging upon it. The diffraction grating 30 may be present on a flat surface, a curved surface, or any other shaped surface. For example, the diffraction grating 30 may be configured to reflect light 42 of different wavelengths in different directions. The diffraction grating 30 may have a thickness 58 of less than or equal to about 700 nm. According to a specific example, the diffraction grating 30 may have a thickness 58 in a range of from about 100 nm to about 300 nm. In another specific example, the diffraction grating 30 may have a thickness 58 of less than or equal to about 200 nm. The thickness 58 of the diffraction grating 30 may affect the optical properties of the applique 14. As depicted in FIG. 4, in an exemplary form, the diffraction grating 30 may define a plurality of ridges 62 having a sawtooth or triangular shape. In three dimensions, the ridges 62 of the diffraction grating 30 can appear with a stepped or sawtooth shape without angular features, pyramidal in shape, or some combination of stepped and pyramidal shapes. In other words, the diffraction grating 30 may include the ruled diffraction grating pattern. Other shapes of the ridges 62 of the diffraction grating 30 include hill-shaped features (e.g., sinusoidal- or curved-shaped features). Stated differently, the diffraction grating 30 may include the holographic and/or spaced-holographic diffraction grating pattern. The diffraction grating 30 can also include portions with a combination of triangular- and hill-shaped ridges. More generally, the shapes of the diffraction grating 30 should be such that an effective blazing angle $\theta_B$ of at least 15 degrees is present for one or more portions of each ridge, grating, tooth, or groove of the diffraction grating 30. The blaze angle $\theta_B$ is the angle between step normal (i.e., the direction normal to each step or tooth of the diffraction grating 30) and a direction normal 68 to a coating surface 70 having the diffraction grating 30.

Generally, the blaze angle $\theta_B$ is optimized to maximize the efficiency of the wavelength(s) of the incident light 42, which may be typical ambient sunlight or light from a light source, to ensure that maximum optical power is concentrated in one or more diffraction orders while minimizing residual power in other orders (e.g., the zeroth order indicative of the ambient light itself). An advantage of situating the diffraction grating 30 on planar portions or aspects of the surface is that a constant blaze angle $\theta_B$ and a period 54 will result in consistent reflected and diffracted light $42_n$, $42_{n+1}$ produced from the diffraction grating 30.

The diffraction grating 30 of the applique 14 may be characterized by one or more periods 54 (also known as d in the standard nomenclature of diffraction grating 30). In various aspects of the applique 14, the period 54 of the diffraction grating 30 is maintained between about 50 nm and about 5 microns. In general, the maximum wavelength that a given diffraction grating 30 can diffract is equal to about twice the period 54. Hence, a diffraction grating 30 with a period 54 that is maintained between about 50 nm and about 5 microns can diffract light $42_n$, $42_{n+1}$ in an optical range of 100 nm to about 10 microns. According to a specific example, the period 54 of a diffraction grating 30 is maintained from about 150 nm to about 400 nm, ensuring that the diffraction grating 30 can efficiently diffract light $42_n$, $42_{n+1}$ in an optical range of about 300 nm to about 800 nm, roughly covering the visible spectrum.

The light 42 at an incident angle $\alpha$ is directed against a sawtooth-shaped diffraction grating 30 having a thickness 58, a period 54, and a blaze angle $\theta_B$. More particularly, a portion of the light 42 striking the diffraction grating 30 at an incident angle $\alpha$ is reflected as reflected light $42_r$ at the same angle $\alpha$, and the remaining portion of the incident light 42 is diffracted at particular wavelengths corresponding to diffracted light $42_n$, $42_{n+1}$, etc., at corresponding diffraction angles $\beta_n$, $\beta_{n+1}$, etc. The reflected light $42_r$ is indicative of the zeroth order (i.e., n=0) and the diffracted light $42_n$, $42_{n+1}$ are indicative of the nth order diffraction according to standard diffraction grating terminology, where n is an integer corresponding to particular wavelengths of the reflected or diffracted light $42_r$, $42_n$. Additionally or alternatively, diffraction grating 30 may employ varying periods 54 (e.g., as including a set of periods 54) that can be employed in iridescent applique 14. Consequently, the diffraction grating 30 advantageously can produce jewel-like effects of widely varying wavelengths within various regions of the pattern 50.

In some aspects, the diffraction grating 30 includes a varying period 54 that varies between two and ten discrete values or, in specific examples, between two and five discrete values across the diffraction grating 30. According to another aspect, the diffraction grating 30 with varying periods 54 can be employed in one or more portions of the coating surface 70 of the polymeric coating 22, and one or more diffraction grating 30 having a constant period 54 are employed in other portions of the polymeric coating 22 to create interesting, jewel-like appearance effects produced by the applique 14 employing the diffraction grating 30. In another example, the diffraction grating 30 includes a varying period 54 that changes between any number of values, only limited by the overall length of the diffraction grating 30 and/or the processing capabilities to develop such variability through precise control of mold dimensions. In another embodiment, there may be a plurality of diffraction grating 30 in a spaced-apart configuration across the applique 14. In such an embodiment, the plurality of diffraction grating 30 may have the same or different period 54.

Figure 5:
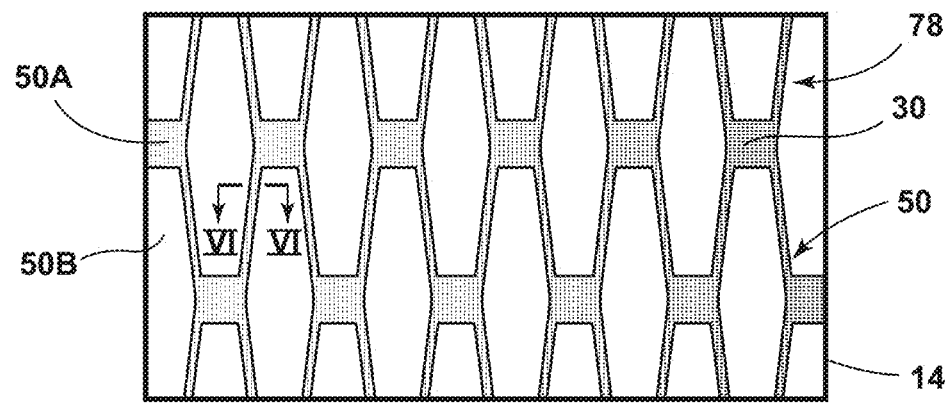
FIG. 5 is an enlarged view of a grille applique of FIG. 1 taken at section V.

Referring to FIG. 5, the diffraction grating 30 may form the pattern 50 across the surface of the applique 14. The pattern 50 may be symmetrical, repeated, and/or continuous. Alternatively, the pattern 50 may be random. The applique 14 may also include several different patterns. The pattern 50 may be defined by the diffraction grating 30 being selectively applied to the polymeric coating 22. Accordingly, some portions of the applique 14 may include the diffraction grating 30 and other portions may not include the diffraction grating 30. Stated differently, the pattern 50 may result in an outline portion 50A of the pattern 50 including diffraction grating 30, and a body portion 50B of the pattern 50 being substantially free of the diffraction grating 30, With reference to FIG. 6, the applique 14 may include the base structure 18 with the polymeric coating 22 disposed thereon. As illustrated, the polymeric coating 22 includes the diffraction grating 30. Alternatively, the base structure 18 may include the diffraction grating 30 defined by the outer surface 26. In various aspects, the base structure 18 and the polymeric coating 22 may include the diffraction grating 30. The diffraction grating(s) on the base structure 18 and the polymeric coating 22 may be the same or different. Having additional patterns of diffraction grating 30 may provide a three-dimensional visual effect to the applique 14.

Referring again to FIGS. 2-6, the diffraction grating 30 may define indicia 78. In various examples, when minimal or no light 42 is directed at the diffraction grating 30, the indicia 78 may be substantially hidden. In this way, the indicia 78 on the applique 14 may not be visible or may be partially visible. When the light 42 is directed on the applique 14, the diffraction grating 30 may scatter the light 42 to reveal the indicia 78 on the applique 14. The indicia 78 may be a pattern 50, design, logo, lettering, picture, or any other indicia 78. In various aspects, the diffraction grating 30 in the polymeric coating 22 and/or the base structure 18 may produce a holographic image or other optical effect.

Figure 6:
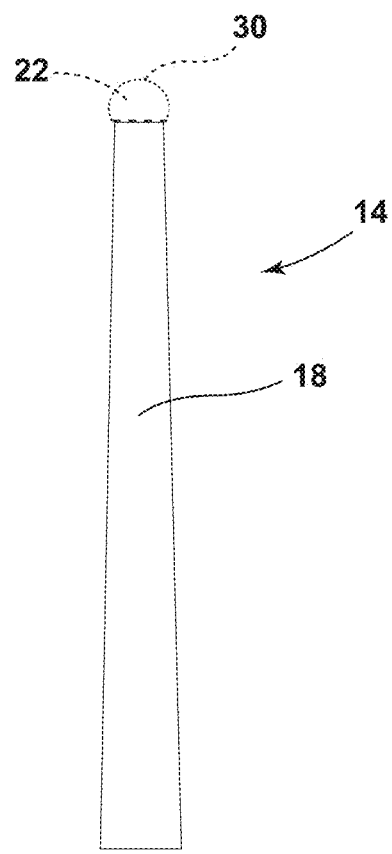
FIG. 6 is a cross-sectional view of the grille applique of FIG. 5 taken along line VI-VI.
Figure 7:
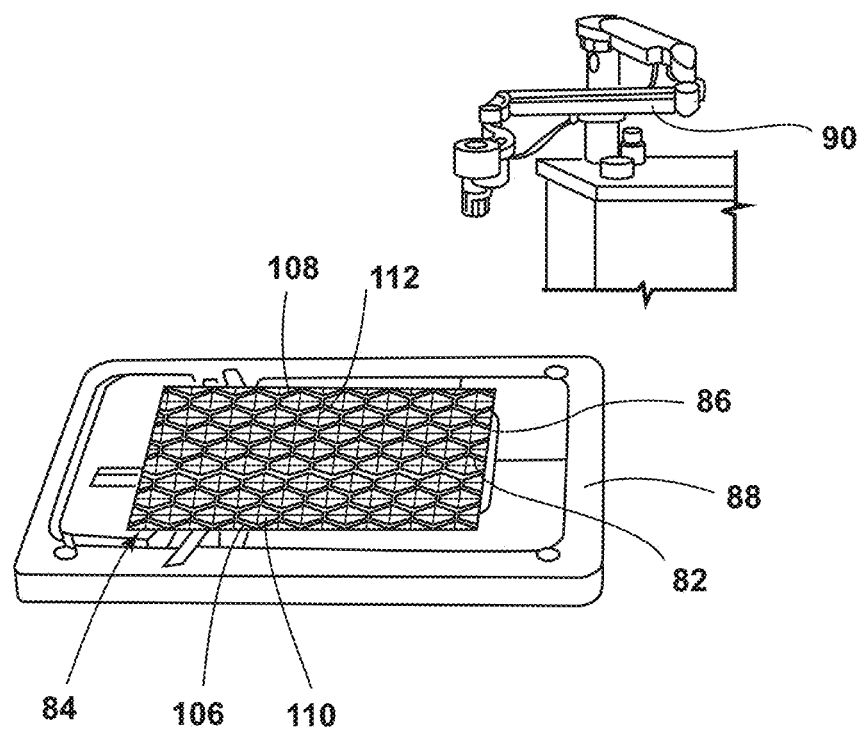
FIG. 7 is a schematic of a nano-engraving process using a femtosecond ultraviolet laser, according to one example.

Referring now to FIG. 7, and with further reference to FIGS. 1-6, the diffraction grating 30 of the polymeric coating 22 may be formed by nano-engraving a mold pattern 84 onto a cavity surface 86 of a mold 88. The mold pattern 84 may be selectively nano-engraved onto one or more cavity surfaces 86 of the mold 88. The mold pattern 84 may be a diffraction grating 30. The nano-engraving of the mold pattern 84 may be accomplished via a femtosecond ultraviolet laser (a "femto-laser") 90. Femto-lasers 90 often include a titanium-sapphire (Ti:sapphire) laser, which may be tunable to emit red and near-infrared light having a wavelength in a range of from about 650 nm to about 1100 nm. The femto-laser 90 generates ultrashort pulses having a duration in a range of from a few picoseconds to about 10 femtoseconds. In a specific example, the femto-laser 90 nano-engraves the cavity surface 86 in pulses having a duration between about 10 femtoseconds and about 15 femtoseconds. The ultrashort duration of the pulses operates to obliterate and/or remove a few molecules of the cavity surface 86 during each pulse. Accordingly, the femto-laser 90 may not produce a heat-affected zone of the cavity surface 86. The short interaction between the femto-laser 90 and the mold 88 may allow the electrons within affected molecules to be heated without heating other molecules. Further, the femto-laser 90 may nano-engrave ultra-fine details in the cavity surface 86 of the mold 88. Accordingly, the femto-laser 90 can provide nano-engravings 82 that are as thin as about 100 nm in thickness 58. Moreover, the femto-laser 90 may operate at a peak power of about 15 GW, which can cause multi-photon ionization (MPI). The intensity of the femto-laser 90 pulsing initiating the mulitaphoton effect may allow for the engraving of solid materials used in tooling (e.g., the mold 88). Additionally or alternatively, the femto-laser 90 may nano-engrave complex surfaces. In a specific aspect, the use of the femto-laser 90 may be advantageous for providing a pattern 50 on a grille applique 14 that includes complex surfaces (FIGS. 5 and 6).

An etching may also be selectively applied to the cavity surface 86 of the mold 88 by the femto-laser 90 or a separate laser. In various examples, a picosecond or nanosecond YAG laser may be used in conjunction with the Ti:sapphire laser. The YAG laser can remove more material from the mold 88 to produce a rough finishing of the cavity surface 86, while the Ti:sapphire laser may provide the more minute diffraction gratings 30. Alternatively, the femto-laser 90 (e.g., the Ti:sapphire laser) may provide the entire pattern 50 on the cavity surface 86.

Figure 8:
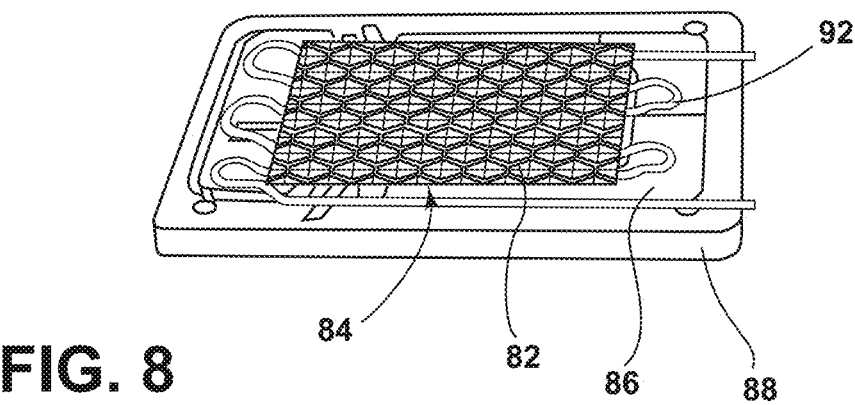
FIG. 8 is a schematic of heating a mold for making a vehicle applique, according to one example.

With reference to FIG. 8, the mold 88 may be heated via induction heating. Heating elements 92 may be disposed behind the cavity surface 86 of the mold 88 for heating the cavity surface 86. In various examples, the cavity surface 86 of the mold 88 may be heated to the melting point of the polymeric material 22A included in the polymeric coating 22. Heating the cavity surface 86 having the etchings and/or nano-engravings 82 may retain the polymeric material 22A in liquid form and/or with a low viscosity to fill the details of the etchings and/or nano-engravings 82. It is also contemplated that the mold 88 may be heated by steam or hot oil.

Figure 9:
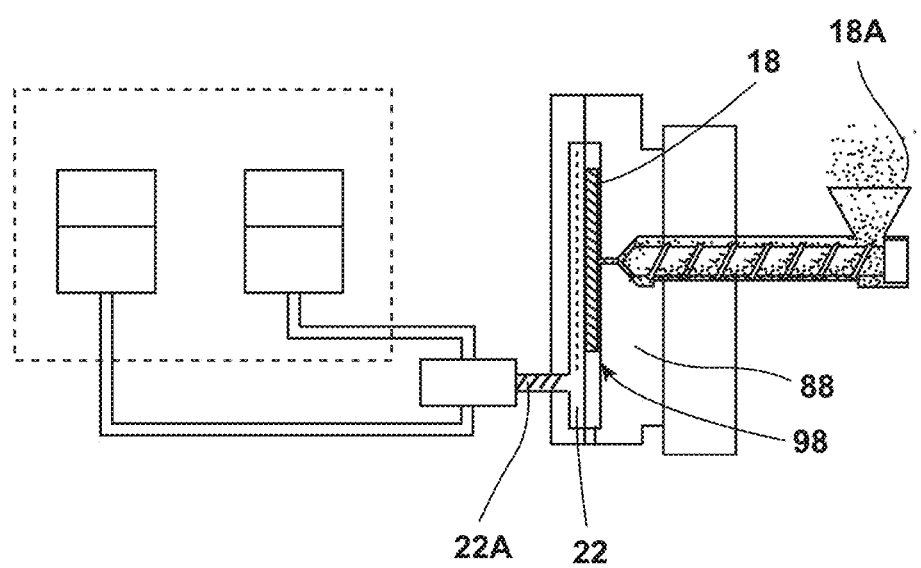
FIG. 9 is a schematic of an insert molding process for making an applique, according to one example.

Referring to FIG. 9, molding of the base structure 18 and the addition of the polymeric coating 22 may be accomplished in a single mold 88 (e.g., a single tool). The mold 88 may be heated and the base material 18A may be injected into a first cavity 98 of the mold 88. The base structure 18 may then be molded into the selected shape for the applique 14. Once the base structure 18 is molded and cooled, the mold 88 is opened and the polymeric material 22A of the polymeric coating 22 can be injected over the base structure 18 within the first cavity 98. Once the polymeric coating 22 has cured, the mold 88 is opened and the applique 14 may be removed.

Figure 10:
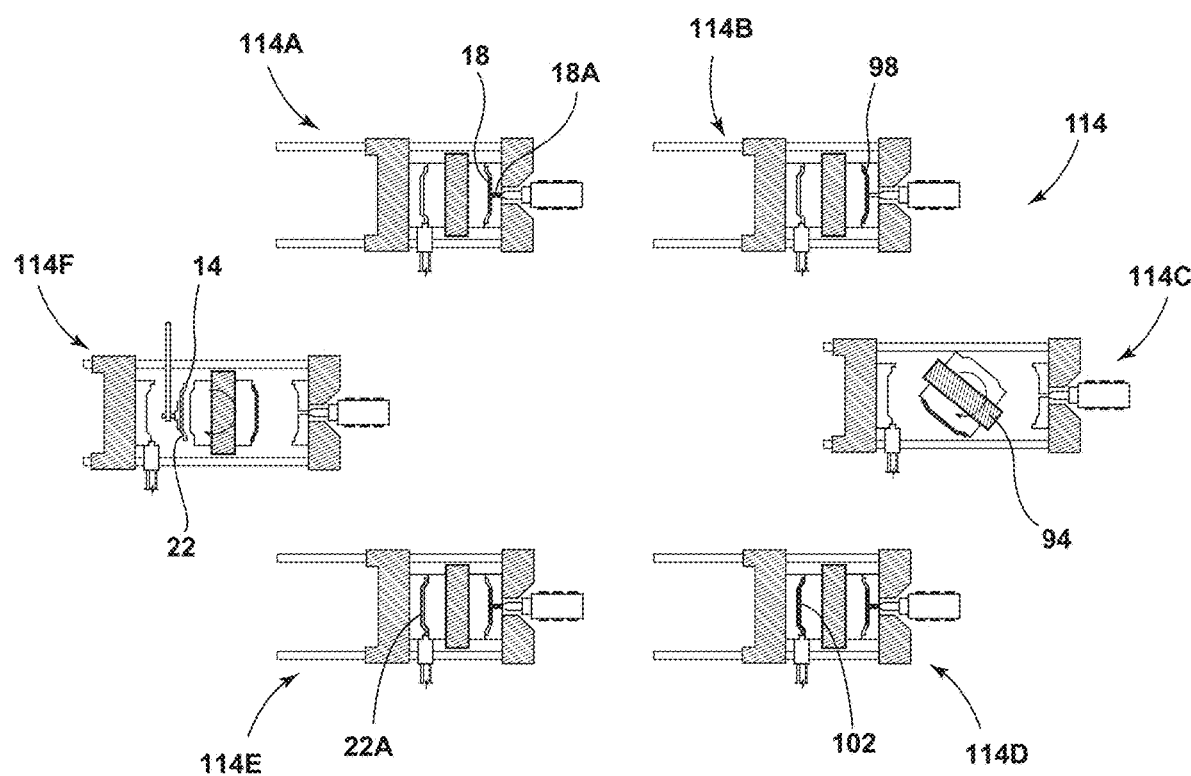
FIG. 10 is a schematic of a two-shot injection molding process for making a vehicle applique, according to one example.

Alternatively, referring to FIG. 10, the applique 14 may be formed through a two-shot injection molding process 114. The two-shot injection molding process 114 may be advantageous for a higher volume of production. In a step 114A of the two-shot injection molding process 114, the base material 18A for the base structure 18 may be injected into a first cavity 98 of the mold 88. In a step 114B, the mold 88 may maintain pressure, allowing the base structure 18 to cool into the selected shape for the applique 14. In a step 114C, the mold 88 may be opened and a swivel plate 94 may be rotated about 180°, such that the base structure 18 is disposed within a second cavity 102 of the mold 88. Once rotated, in a step 114D, the mold 88 may close again and the polymeric material 22A polymeric coating 22 may be injected into the second cavity 102 over the base structure 18. Simultaneously, or about simultaneously, the base material 18A for the base structure 18 for the next applique 14 produced is injected into the first cavity 98 of the mold 88. In a step 114E, the mold 88 may hold pressure, allowing for the polymeric coating 22 to cure and the base structure 18 to cool. In a step 114F, the mold 88 may then be reopened and the applique 14 (the combined base structure 18 and polymeric coating 22) may be removed, and the swivel plate 94 may rotate about 180° for the cycle to repeat (e.g., begin again at step 114A).

Figure 11:
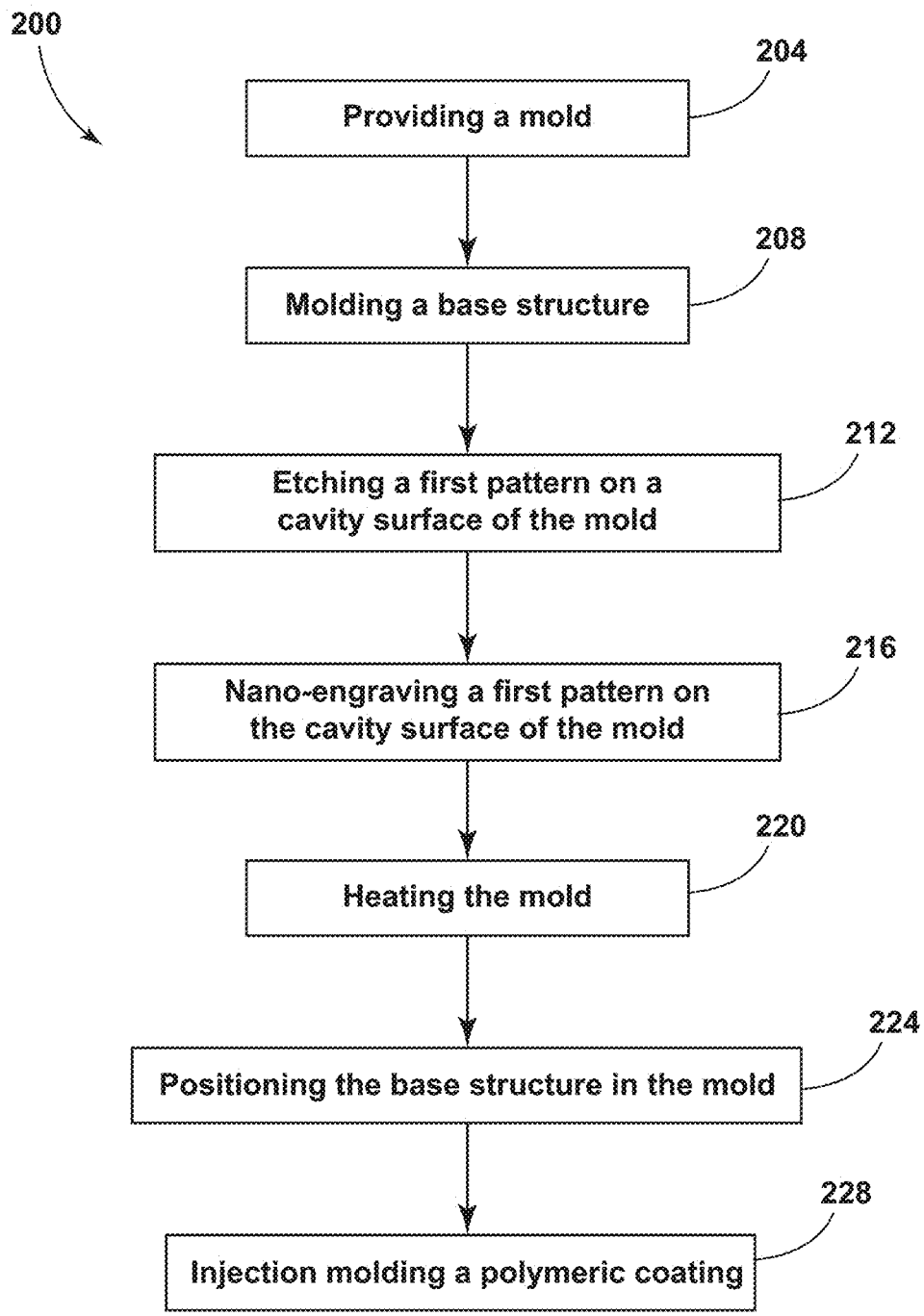
FIG. 11 is a flow diagram of a method of manufacturing a vehicle applique, according to one example.

Referring to FIG. 11, and with further reference to FIGS. 1-10, a method 200 of manufacturing the applique 14 includes a step 204 of providing a mold 88. The mold 88 may be utilized in overmolding the polymeric coating 22 onto the base structure 18 or, alternatively, for two-shot injection molding process 114.

The method 200 includes a next step 208 of molding the base structure 18. The base structure 18 may be molded into the grille applique, the pillar feature, the emblem, or any of the other style appliques 14, as discussed previously herein. The base structure 18 may be molded in a same cavity of the mold 88 or a separate cavity relative to the polymeric coating 22. Accordingly, the base structure 18 may define a diffraction grating 30. Alternatively, the base structure 18 may not define the diffraction grating 30.

A next step 212 of the method 200 may include etching the cavity surface 86 of the mold 88. The etching may be accomplished with a YAG laser or within a Ti:sapphire laser (e.g., the femto-laser 90). The etching may provide a first pattern 106 on the cavity surface 86. The first pattern 106 may or may not include diffraction grating 30. The etching may be selectively applied to the cavity surface 86, such that the first pattern 106 is provided on a first portion 108 of the cavity surface 86 and leaves a second portion 112 of the cavity surface 86 substantially free of the diffraction grating 30. The etching may be provided on one or more surfaces of the mold 88.

Next, a step 216 includes nano-engraving 82 a second pattern 110 on the cavity surface 86 of the mold 88. The nano-engraving 82 may produce the second pattern 110 including the diffraction grating 30 on the cavity surface 86. The nano-engraving 82 may be accomplished with the femto-laser 90, which may be advantageous for providing minute details for the diffraction grating 30. In a specific example, the nano-engravings 82 may have a depth in the cavity surface 86 in a range of about 100 nm to 300 nm. In another specific example, the nano-engravings 82 may have a depth about or less than 200 nm. Accordingly, the nano-engravings 82 may produce a diffraction grating 30 having a thickness 58 in a range of from about 100 nm to about 300 nm, or about or less than 200 nm, accordingly. The nano-engravings 82 may be applied to the first portion 108 of the cavity surface 86, the second portion 112 of the cavity surface 86, and/or a combination thereof.

A step 220 includes heating the mold 88. As previously explained with reference to FIG. 8, the cavity surface 86 may be heated via induction heating by the heating elements 92. The heating of the cavity surface 86 having the etchings and/or nano-engravings 82 allows for the material of the polymeric coating 22 to remain highly viscous and fill the minute details of the first and second patterns 106, 110 (e.g., the diffraction grating 30) in the cavity surface 86.

In a step 224, the base structure 18 is positioned within the mold 88. The base structure 18 may be disposed within the mold 88 from when the base structure 18 was molded, as in the step 224, or may be formed separately and later disposed within the mold 88. The step 224 may also include cooling the base structure 18, such that the base structure 18 may retain its shape when the mold 88 is opened.

Next, in a step 228, the polymeric coating 22 is injected over the base structure 18. As previously explained with respect to FIG. 9, the polymeric coating 22 may be molded over the base structure 18 after the base structure 18 is molded. Alternatively, as previously discussed with respect to FIG. 10, the polymeric coating 22 may be injected over the base structure 18 in the two-shot injection molding 114 process. The polymeric coating 22 may remain viscous, at least in part due to the heated mold 88 and/or cavity surface 86 of the mold 88. In various examples, the material of the polymeric coating 22 may be in liquid form under normal conditions (e.g., pressure, temperature, etc.). As such, the liquid material may be viscous with or without the heated mold 88. The polymeric coating 22 may flow over the base structure 18 and fill the etchings and/or nano-engravings 82 of the cavity surface 86. Accordingly, the mold pattern 84 and/or the etchings and/or nano-engravings 82 in the cavity surface 86 may be a mirror image of the selected diffraction grating 30 or pattern 50 to be integrally defined by the polymeric coating 22. The polymeric coating 22 including polyurethane and/or polyuria may be advantageous for defining the diffraction grating 30 nano-engraved by the femto-laser 90. The step 228 may also include the polymeric coating 22 curing, and the applique 14 being removed from the mold 88.

Use of the present disclosure may provide for a variety of advantages. For example, the use of the femto-laser 90 may provide for minute nano-engravings 82 that may not be attainable with a conventional laser. Further, the femto-laser 90 may provide nano-engravings 82 with minute details to provide for a variety of patterns 50. Moreover, the femto-laser 90 may operate in ultra-short pulses with higher power, which may allow a variety of surfaces, including the cavity surface 86 of a mold 88 or other tooling, to be nano-engraved. The diffraction grating 30 formed by the femto-laser 90 may be substantially hidden when minimal or no light 42 is directed at the applique 14. When light 42 is directed at the applique 14, the diffraction grating 30 may diffract the light 42 to reveal the pattern 50 on the applique 14. Moreover, the diffraction grating 30 may be applied to base structures 18 that have complex surfaces, which may not be accomplished with a conventional laser. The polymeric coating 22 may provide durability for the applique 14. The polymeric coating 22 may be scratch-resistant and ultraviolet (UV) resistant and may prevent weathering of the applique 14, thereby increasing the lifetime of the applique 14. Additionally, the polymeric coating 22 may have a more aesthetically appealing design than conventional painted appliques, as conventional painted appliques may have an orange peel that may prevent the selected appearance.

According to various examples, a vehicle applique includes a base structure and a polymeric coating disposed on the base structure. The polymeric coating at least partially covers an outer surface of the base structure. A diffraction grating is integrally defined by the polymeric coating. The diffraction grating has a thickness in a range of from about 100 nm to about 300 nm. Embodiments of the present disclosure may include one and/or a combination of the following features:

- a polymeric coating includes at least one of polyurethane and polyuria;
- a diffraction grating has a period in a range of from about 50 nm to about 5 microns;
- a diffraction grating has a period in a range of from about 150 nm to about 400 nm;
- a diffraction grating defines indicia;
- a diffraction grating includes a ruled grating pattern; and
- a diffraction grating includes a holographic grating pattern.

According to various examples, a method of manufacturing a vehicle applique includes providing a mold and selectively etching a first pattern on at least one surface of the mold. A second pattern is selectively nano-engraved on the at least one surface of the mold. The second pattern includes a diffraction grating. A base structure is positioned within the mold. A polyurethane coating is injection molded into the mold. Embodiments of the present disclosure may include one or a combination of the following features:

- heating a mold to a melting point of a polyurethane coating;
- a femtosecond ultraviolet laser forms a nano-engraved second pattern;
- selective nano-engraving occurs in pulses having a duration between about 10 femtoseconds and about 15 femtoseconds;
- selective nano-engraving produces the diffraction grating having a thickness of less than about 700 nm;
- selective nano-engraving produces the diffraction grating has a thickness of less than about 200 nm;
- molding a base structure into a pillar feature for a vehicle; and
- molding a base structure into a vehicle grille.

According to various examples, a method of manufacturing a vehicle applique including providing a mold and nano-engraving a diffraction grating on a surface of the mold. The surface of the mold is heated via induction heating. A base structure is positioned within the mold. A polymeric coating is injection molded over the base structure. Embodiments of the present disclosure may include one or a combination of the following features:

- selective nano-engraving provides a diffraction grating on a first portion of a mold and leaves a second portion of a mold substantially free of the diffraction grating;
- a surface of a mold is heated to a melting point of a polymeric coating;
- a femtosecond ultraviolet laser forms a nano-engraved diffraction grating; and
- nano-engraving produces a diffraction grating having a thickness of less than about 700 nm.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a window; and
   an applique coupled to the window, wherein the applique includes:
      a base structure coupled to a surface of the window;
      a polymeric coating disposed on the base structure, wherein the polymeric coating at least partially covers an outer surface of the base structure, wherein the polymeric coating is optically clear for transmission of visible light having a wavelength between 400 nm and 700 nm and has a haze of 10% or less; and
      a diffraction grating integrally defined by the polymeric coating, wherein the diffraction grating has a thickness in a range of from about 100 nm to about 300 nm, and wherein at least a portion of the diffraction grating has a blaze angle of at least 15 degrees.

2. The vehicle of claim 1, wherein the polymeric coating includes at least one of polyurethane and polyuria.

3. The vehicle of claim 1, wherein the diffraction grating has a period in a range of from about 50 nm to about 5 microns.

4. The vehicle of claim 1, wherein the diffraction grating has a period in a range of from about 150 nm to about 400 nm.

5. The vehicle of claim 1, wherein the diffraction grating defines indicia.

6. The vehicle of claim 1, wherein the diffraction grating includes a ruled grating pattern.

7. The vehicle of claim 1, wherein the diffraction grating includes a holographic grating pattern.

8. The vehicle of claim 1, wherein the polymeric coating defines a first nano-engraved defining the diffraction grating and a second etched pattern, wherein the thickness of the first nano-engraved pattern is less than a thickness of the second etched pattern.

9. The vehicle of claim 1, wherein the base structure defines a second diffraction grating different than the diffraction grating defined by the polymeric coating.

10. The vehicle of claim 1, wherein the diffraction grating defines a pattern such that a portion of the polymeric coating has the diffraction grating and a portion of the polymeric coating is free from the diffraction grating.

11. The vehicle of claim 1, wherein the pattern of the diffraction grating defines characters.

12. The vehicle of claim 1, wherein the diffraction grating includes features that are at least one of a ridge, tooth, and groove, and wherein at least a portion of each feature has the blaze angle of at least 15 degrees.

* * * * *